United States Patent [19]

Bennett

[11] Patent Number: 5,154,784
[45] Date of Patent: Oct. 13, 1992

[54] PROCESS FOR MANUFACTURING A LITHIUM ALLOY ELECTROCHEMICAL CELL

[75] Inventor: William R. Bennett, North Olmstead, Ohio

[73] Assignee: Westinghouse Electric Corp., Pittsburgh, Pa.

[21] Appl. No.: 649,510

[22] Filed: Feb. 1, 1991

[51] Int. Cl.$^5$ .................. B27N 3/00; C04B 35/00; B29D 7/00
[52] U.S. Cl. ................... 156/62.2; 264/104; 264/212
[58] Field of Search ............ 156/89, 62.2; 264/104, 264/63, 212; 204/410

[56] References Cited

U.S. PATENT DOCUMENTS

| | | | |
|---|---|---|---|
| 3,698,923 | 10/1972 | Stetson et al. | 106/62 |
| 4,386,019 | 5/1983 | Kaun et al. | 252/503 |
| 4,409,168 | 10/1983 | Mrazek et al. | 264/104 |
| 4,657,659 | 4/1987 | Mase et al. | 204/410 |

OTHER PUBLICATIONS

Alan Hooper et al. "All-Solid-State Batteries", Journal of Power Sources, 11 (1984), pp. 33-41.

Primary Examiner—James Lowe
Assistant Examiner—Christopher A. Fiorilla
Attorney, Agent, or Firm—J. C. Valentine

[57] ABSTRACT

A process for manufacturing a lithium alloy, metal sulfide cell tape casts slurried alloy powders in an organic solvent containing a dissolved thermoplastic organic binder onto casting surfaces. The organic solvent is then evaporated to produce a flexible tape removable adhering to the casting surface. The tape is densified to increase its green strength and then peeled from the casting surface. The tape is laminated with a separator containing a lithium salt electrolyte and a metal sulfide electrode to form a green cell. The binder is evaporated from the green cell at a temperature lower than the melting temperature of the lithium salt electrolyte. Lithium alloy, metal sulfide and separator powders may be tape cast.

14 Claims, No Drawings

PROCESS FOR MANUFACTURING A LITHIUM ALLOY ELECTROCHEMICAL CELL

BACKGROUND

This invention was made in the course of a contract with the United States Department of Army.

This invention relates to a process for manufacturing a lithium alloy electrochemical cell and, more particularly, to a tape casting process for making cells from powders.

Lithium alloy batteries are being developed for advanced electric power applications. For example, lithium alloy, metal sulfide batteries employing molten salt electrolytes have been developed for rechargeable applications. The energy density of this electrochemical couple is about twice the expected energy density of conventional lead-acid batteries according to a recent survey of solid state batteries (Alan Hooper et al., All-Solid-State Batteries, Journal of Power Sources, Vol. 11, pp. 33-41, 1984). The high energy density is due to the low density and electronegativity of the lithium anode material. U.S. Pat. No. 4,386,019 discloses that the lithium anode may be alloyed with aluminum, silicon or magnesium. Also, the metal sulfide may be iron sulfide, cobalt sulfide, nickel sulfide or copper sulfide. Lithium aluminum, iron sulfide and lithium aluminum, cobalt sulfide electrochemical couples are employed with molten salts in the range of 350° C.-550° C. according to these references.

U.S. Pat. No. 4,386,019 generally discloses several processes for manufacturing electrochemical cells employing lithium alloy anodes. Generally, lithium alloys in the form of powder or extruded wire are pressed using conventional metallurgical techniques. However, the anodes are very thin and may be no thicker than about 2 to 5 mm. It is very difficult and time consuming to uniformly distribute powdered material on a die floor and press uniformly thick sheets, even when the sheets are no more than about 20 $cm^2$. In addition, although die pressures of 1400 to 2100 $Kg/cm^2$ (20 to 30 kpsi - thousand pounds per square inch) are employed to cold press the powder into sheets, the sheets are very delicate and have poor strength. Thus the cells must be very carefully assembled. The commercial production of cells having areas of up to 100 $cm^2$ or more will prove to be particularly difficult by a conventional type by pressing technique.

U.S. Pat. No. 4,386,019 specifically relates to a process of making lithium aluminum electrodes by slurrying powders in an inert organic solvent and then extruding the slurry. Such a process is said to be an improvement over prior tape casting processes. The prior tape casting processes employ resin binders which decompose to evolve water and other decomposition products deleteriously affecting cell performance. As is disclosed by U.S. Pat. No. 3,698,923 (relating to such a process for casting alumina tapes), resin binders are employed to give green tapes flexibility and workability characteristics after the organic solvent is evaporated from the tapes. As is further disclosed, the binders must not cause cracks, pin holes or other imperfections in the tapes. Also, the binder selection is in part dependent upon the casting surface because the binders more or less bond with the casting surface when the solvent is evaporated. Polyvinyl butyryl resin is the preferred binder where the casting surface is Mylar glycol terephthalic acid polyester, cellulose acetate, fluoro halocarbon or a chromium-plated surface. This resin tends to form a strong bond with glass so that tearing is a concern when the tape is removed from a glass surface. Other binders include polymethyl methacrylate resin and cellulose acetate butyryl resin and the like. The binders are ordinarily plasticized with compatible plasticizers.

SUMMARY OF THE INVENTION

It is an object of the present invention to provide a process for manufacturing a lithium alloy electrochemical cell wherein flexible dried tapes are removably cast on casting surfaces and then employed in a cell which is not deleteriously effected by residues of the casting process. It is a further object of the present invention to provide a process for manufacturing such electrochemical cells having surface areas of up to 100 $cm^2$ or more.

With these objects in view, the present invention resides in a process for manufacturing a lithium alloy electrochemical cell from powders which are tape cast as a slurry onto a casting surface. The slurry preferably comprises a lithium alloy in an inert organic solvent containing a dissolved thermoplastic binder. Preferably, the lithium alloy tape is laminated with metal sulfide which is similarly tape cast. In addition, the cell preferably employs a porous separator between the electrodes to prevent short circuits so that a mixture of a lithium salt electrolyte powder and a suitable separator powder such as an electrically non-conducting oxide powder are also preferably tape cast in a similar manner. The organic solvent is evaporated from the slurry (or preferably slurries) to provide a flexible tape removably adhering to the casting surface. The tape is densified to increase its green strength, peeled from the casting surface, and then laminated with the cathode and preferably an intermediate separator (which cathode and separator are also preferably tape cast) to form a green cell. The thermoplastic organic binder is then decomposed and evaporated from the green cell at a temperature below the melting temperature of the lithium salt electrolyte.

In a preferable practice of the present invention, lithium aluminum powders, cobalt sulfide powders and a powdered mixture of a lithium salt and magnesium oxide are slurried separately with a fully saturated aliphatic organic such as hexane containing dissolved polyisobutylene. These organic compounds permit flexible tapes of these powders to be tape cast on Mylar surfaces. Such tapes may be bent to a radius of about 200 mm (8 inches) before cracks become evident. The tapes may be readily peeled from the casting surfaces without tearing and are flexible and tough enough to permit even large tapes of 100 $cm^2$ or more to be readily handled, sized, shaped and assembled into green cells. In addition, hexane and polyisobutylene exhibit low moisture pickup so that tapes containing these organic compounds may advantageously stay dry of moisture during processing and storage. Importantly, binders such as polyisobutylene depolymerize under about 400° C. (preferably in a vacuum) and evaporate from a green cell without leaving substantial amounts of a residue (such as carbon) which may deleteriously affect cell performance by reacting with the lithium. Also, at 400° C. or less, the decomposition temperature is well below the melting temperature of lithium salt electrolytes such as a lithium halide mixture and the like. Thus, the cell remains entirely solid during the manufacturing process.

DESCRIPTION OF THE PREFERRED PRACTICE

The invention will become more readily apparent from the following description of the preferred practice thereof.

In the preferred practice, lithium alloy powders, metal sulfide powders and a powdered mixture of lithium salt electrolyte and a non-conducting oxide are separately tape cast as described below, laminated together and assembled to form a lithium alloy, metal sulfide cell. In other practices, only the lithium alloy powder is tape cast. For example, such a tape may be laminated With a solid electrolyte or other type of surface. The powders are slurried with an inert organic solvent such as a fully saturated aliphatic like hexane, heptane and the like which will evaporate at about room temperature up to about 200° C. The organic solvent contains a dissolved thermoplastic binder such as polyisobutylene which may be decomposed at temperatures of less than about 400° C. and evaporated without substantial amounts of a residue which reacts with lithium. Preferably, the powdered materials comprise about 50% by weight of the slurry and have particle sizes of less than about 40 mesh. Also, the binders preferably comprise about 2.5% by weight of the solvent. In addition, the same solvent composition may be employed to slurry the different powders in order to simplify the process although different compositions may be employed. Also, various known slurry modifying agents may be employed to control viscosity and other properties. The viscous character of the organic vehicle and fine particle size combine to form relatively stable slurries which resist rapid settling.

The slurries may be outgassed and then controllably cast under a doctor blade onto a casting surface which is preferably a Mylar glycol terephthalic acid polyester surface. Alternatively, cellulose surfaces may be employed with lithium alloy tapes in other practices. The slurried powders have a paint-like consistency which can be cast onto a Mylar surface at a uniform thickness. The dry thicknesses of the tapes may be as thin as 2 to 5 mm or less.

In addition, the lithium alloy containing slurry and the metal sulfide containing slurry may be tape cast directly onto metallic conductive current collector sheets or bipolar walls rather than Mylar surfaces and the like. If desired, the tape may be peeled from these surfaces.

The solvent is evaporated from the tape cast slurries to produce thin flexible tapes removably adhering to the Mylar casting surfaces. The solvent is evaporated at about room temperature or higher and preferably at about 50° C.–70° C. and at a suitable absolute pressure which yields a flawless flat layer. The tapes and Mylar casting surface are sufficiently flexible that they can be handled and even trimmed to size if desired. In addition, the tapes and Mylar casting surface may be stored as a unit to enhance part strength and to limit airborne contamination of the tape.

The flexible tapes are densified at a pressure of about 350 to 700 kg/cm$^2$ (5 to 10 kpsi) and preferably at about room temperature to enhance their green strength. The tapes are then peeled from the Mylar surfaces and laminated together. Advantageously the lamination is stronger than the individual tapes. Preferably, the sides of the tapes adjacent the casting surfaces are placed adjacent intermediate separators comprising a porous non-conductor such as magnesium oxide and electrolyte. The tapes may be laminated together at about 700 to 1400 kg/cm$^2$ (10 to 20 kpsi) at room temperature to form a green cell which is leathery and easily handled.

The thermoplastic binder is evaporated from the green cell at a temperature lower than the minimum melting temperature of the lithium-containing salt and most preferably at a temperature of about 300° C. or less so that the entire cell remains solid yet sufficiently porous to allow decomposition products to evolve. The green cell may be trimmed to final size before the binder is evaporated. The binder is preferably heated in an inert atmosphere of, e.g., argon and then evaporated at high vacuums of, e.g., 100 millitorr to protect the reactive materials. After the binder has evaporated, the cell may be densified by fusing the electrolyte at a temperature of up to about 500° C. The treated cells are chalky and hard and may be installed into battery assemblies. Alternatively, the green cells may be installed before the binder is evaporated and the battery case sealed.

A preferred cell manufactured in accordance with the preferred practice has a lithium-aluminum electrode and a cobalt sulfide electrode separated by a porous magnesium oxide separator containing a lithium-containing salt such as a lithium halide or a mixture of lithium halides. Preferably, these elements are tape cast as described above in a hexane solvent containing polyisobutylene as a binder. Hexane and polyisobutylene are inert to the cell powders and exhibit low moisture pickup. In addition, hexane is sufficiently volatile to produce fast drying tapes without "mud cracking". Also, thermogravimetric analysis has shown complete decomposition of polyisobutylene in argon gas at 380° C. Preferably, the binder evaporation step is carried out at about 100 millitorr absolute pressure in order to most rapidly remove the decomposed residue.

The improved process makes it possible to produce cells having areas of up to 100 cm$^2$ and more which are tough and flexible, and generally require lower press tonnages than are necessary with dry powder processes. Moreover, the tapes may continuously cast at high rates whereas dry powder processes only batch press the powder. Demonstration cells produced in accordance with the improved process have exhibited performance characteristics which are as good as binderless cells.

While the preferred practice of the present invention and a preferred embodiment thereof have been described as have certain advantages, details and benefits thereof, it is to be distinctly understood that the invention is not limited thereto but may be otherwise variously embodied within the scope of the following claims.

I claim:

1. A process for manufacturing a lithium alloy electrochemical cell, comprising the steps of:
   casting a slurry of a lithium alloy powder in an organic solvent containing a polyisobutylene binder dissolved therein onto a casting surface which is selected from the group consisting of glycol terephthalic acid polyester and cellulose;
   evaporating the organic solvent from the slurry to produce a flexible tape removably adhering to the casting surface;
   densifying the tape to increase its green strength;
   peeling the densified tape from the casting surface;
   laminating the densified tape with a lithium salt electrolyte to form a green cell; and evaporating the polyisobutylene binder from the laminated tape at a temperature lower than the melting temperature of the lithium salt electrolyte.

2. The process of claim 1, wherein the organic solvent is evaporated from the slurry at about room temperature.

3. The process of claim 1, wherein the tape is densified at a pressure of about 350 to 700 kg/cm$^2$ (5 to 10 kpsi).

4. The process of claim 1, wherein the densified tape is laminated at a pressure of about 700 to 1400 kg/cm$^2$ (10 to 20 kpsi).

5. The process of claim 1, wherein the binder is evaporated from the green cell at a temperature of less than about 300° C.

6. A process for manufacturing a lithium alloy, metal sulfide electrochemical cell, comprising the steps of:

casting a slurry of a lithium alloy powder in an organic solvent containing a polyisobutylene binder dissolved therein onto a casting surface selected from the group consisting of glycol terephthalic acid polyester and cellulose;

casting a slurry of a metal sulfide powder in an organic solvent containing a dissolved thermoplastic organic binder onto a casting surface;

casting a slurry of an electrically non-conductive powder and a lithium salt electrolyte powder in an organic solvent containing a dissolved thermoplastic organic binder onto a casting surface;

evaporating the organic solvents from the three slurries to develop three flexible tapes removably adhering to the casting surfaces;

densifying the three tapes;

peeling the three densified tapes from the casting surfaces;

laminating the three densified tapes together to form a green cell; and evaporating the lithium alloy powder binder from the green cell at a temperature lower than the minimum melting temperature of the lithium salt electrolyte.

7. The process of claim 6, wherein the organic solvents are evaporated from the three slurries at about room temperature.

8. The process of claim 6, wherein the three tapes are densified at a pressure of about 350 to 700 (5 to 10 kpsi).

9. The process of claim 6, wherein the three tapes are laminated together by pressing the tapes at a pressure of about 700 to 1400 kg/cm$^2$ (10 to 20 kpsi).

10. The process of claim 6, wherein the binders are evaporated from the green cell at a temperature of less than about 300° C.

11. The process of claim 10, wherein the solvent is hexane.

12. The process of claim 11, wherein the lithium aluminum powder casting surface is glycolterephthalic acid polyester.

13. The process of claim 10, wherein the metal oxide powder is magnesium oxide.

14. A process for manufacturing a lithium aluminum, cobalt sulfide electrochemical cell, comprising the steps of: p1 casting a slurry of a lithium aluminum powder in a saturated aliphatic solvent containing a polyisobutylene binder dissolved therein onto a casting surface;

casting a slurry of a cobalt sulfide powder in a saturated aliphatic solvent containing a thermoplastic binder dissolved therein onto a casting surface;

casting a slurry of a metal oxide powder and a lithium salt electrolyte powder in a saturated aliphatic solvent containing a thermoplastic binder dissolved therein onto a casting surface;

evaporating the saturated aliphatic solvents from the three slurries to develop three flexible tapes of powders bound together by the binders and removably adhering to the casting surfaces;

densifying the flexible tapes of about room temperature and about 350 to 700 kg/cm$^2$ (5 to 10 kpsi);

peeling the three densified tapes from the casting surfaces;

laminating the three densified tapes together at a about 700 to 1400 kg/cm$^2$ (10–20 kpsi) to form a green cell; and evaporating the lithium aluminum powder binder from the green cell at a temperature of less than about 300° C.

* * * * *